United States Patent
Meissner et al.

(10) Patent No.: US 10,369,583 B2
(45) Date of Patent: Aug. 6, 2019

(54) CENTRALLY CONTROLLED COATING SYSTEM FOR PAINTING MOTOR VEHICLE BODY COMPONENTS

(71) Applicant: Dürr Systems AG, Bietigheim-Bissingen (DE)

(72) Inventors: Alexander Meissner, Stuttgart (DE); Frank Herre, Oberriexingen (DE); Andreas Federmann, Stuttgart (DE); Martin Weidle, Gerlingen (DE); Heiko Friese, München (DE); Pascal Spathelf, Illingen (DE); Michael Lauer, Stuttgart (DE)

(73) Assignee: DÜRR SYSTEMS AG, Bietigheim-Bissingen (DE)

( * ) Notice: Subject to any disclaimer, the term of this patent is extended or adjusted under 35 U.S.C. 154(b) by 0 days.

(21) Appl. No.: 15/308,960

(22) PCT Filed: May 4, 2015

(86) PCT No.: PCT/EP2015/000909
§ 371 (c)(1),
(2) Date: Nov. 4, 2016

(87) PCT Pub. No.: WO2015/169433
PCT Pub. Date: Nov. 12, 2015

(65) Prior Publication Data
US 2017/0072419 A1 Mar. 16, 2017

(30) Foreign Application Priority Data
May 7, 2014 (DE) .................... 10 2014 006 651

(51) Int. Cl.
*B05B 13/04* (2006.01)
*G05B 19/418* (2006.01)
(Continued)

(52) U.S. Cl.
CPC .......... *B05B 13/0452* (2013.01); *B05B 12/12* (2013.01); *B05B 12/122* (2013.01);
(Continued)

(58) Field of Classification Search
CPC . B05C 11/1002; B05C 15/00; B05B 13/0452; B05B 13/0431
(Continued)

(56) References Cited

U.S. PATENT DOCUMENTS 3,991,710 A * 11/1976 Gourdine ............... B05B 5/032
118/634
4,154,101 A * 5/1979 Buchanan ................ G01F 1/28
73/272 R
(Continued)

FOREIGN PATENT DOCUMENTS

CN 101733228 A 6/2010
DE 3014114 A1 11/1981
(Continued)

OTHER PUBLICATIONS

International Search Report and Written Opinion for PCT/EP2015/000909 dated Aug. 3, 2015 (w/ English Translation; 13 pages).

*Primary Examiner* — Karl Kurple
(74) *Attorney, Agent, or Firm* — Bejin Bieneman PLC (57) ABSTRACT

A coating system for coating components, e.g., for paining motor vehicle body components, is provided. The system includes a coating booth, a conveying system, an application system, a process technology system, a safety system, and a robot system. The robot system includes at least one multi-axis coating robot for guiding the application device and a control unit. The control unit also controls the conveying system, the application system, the safety system and/or the process technology system.

20 Claims, 4 Drawing Sheets

(51) Int. Cl.
  *B25J 11/00* (2006.01)
  *B05B 12/12* (2006.01)
  *B05B 16/00* (2018.01)
  *B05B 16/40* (2018.01)
  *B25J 9/00* (2006.01)

(52) U.S. Cl.
  CPC .............. *B05B 16/40* (2018.02); *B05B 16/90* (2018.02); *B25J 9/0093* (2013.01); *B25J 11/0075* (2013.01); *G05B 19/418* (2013.01)

(58) Field of Classification Search
  USPC ........................................................ 700/283
  See application file for complete search history.

(56) References Cited

U.S. PATENT DOCUMENTS

| | | | |
|---|---|---|---|
| 4,357,900 A | | 11/1982 | Buschor |
| 4,484,513 A | * | 11/1984 | Napadow .............. B01D 45/10 454/55 |
| 4,593,360 A | | 6/1986 | Cocks |
| 4,608,064 A | * | 8/1986 | Napadow ............. B01D 50/004 96/307 |
| 4,931,322 A | * | 6/1990 | Yamamoto ........... B05B 12/122 427/424 |
| 5,085,374 A | * | 2/1992 | Okuda ................ B05B 13/0452 239/751 |
| 5,347,463 A | | 9/1994 | Nakamura |
| 5,389,149 A | * | 2/1995 | Carey ................... B05B 12/122 118/302 |
| 5,429,682 A | * | 7/1995 | Harlow, Jr. ........... B05B 7/0815 118/316 |
| 5,674,570 A | * | 10/1997 | Fouvet ................ B05B 13/0221 427/425 |
| 5,832,411 A | * | 11/1998 | Schatzmann ...... G01N 33/0075 702/23 |
| 5,997,653 A | * | 12/1999 | Yamasaka ................ B08B 3/02 134/102.1 |
| 6,059,884 A | | 5/2000 | Seitz et al. |
| 6,484,121 B1 | | 11/2002 | Filev et al. |
| 2002/0096319 A1 | * | 7/2002 | Valachovic ........ G05D 23/1932 165/263 |
| 2003/0154920 A1 | * | 8/2003 | Charpin .............. B05B 13/0431 118/696 |
| 2008/0092929 A1 | * | 4/2008 | Yokouchi .......... H01L 21/67034 134/30 |
| 2010/0186664 A1 | | 7/2010 | Ansorge |
| 2012/0219700 A1 | * | 8/2012 | Herre .................... B05B 5/0422 427/8 |
| 2014/0109830 A1 | | 4/2014 | Herre et al. |
| 2015/0367371 A1 | * | 12/2015 | Fernholz ................ B05B 16/60 454/53 |
| 2017/0291188 A1 | * | 10/2017 | Blackwell ............... B05B 16/80 |

FOREIGN PATENT DOCUMENTS

| | | |
|---|---|---|
| DE | 4122037 A1 | 1/1992 |
| DE | 19730035 A1 | 2/1999 |
| DE | 10134159 A1 | 3/2002 |
| DE | 60104666 T2 | 8/2005 |
| DE | 102009051877 A1 | 5/2011 |
| DE | 102011108262 A1 | 1/2013 |
| EP | 0899018 A1 | 3/1999 |
| JP | 2010137204 A | 6/2010 |
| WO | 0175540 A1 | 10/2001 |
| WO | 2009018841 A1 | 2/2009 |

* cited by examiner

CENTRALLY CONTROLLED COATING SYSTEM FOR PAINTING MOTOR VEHICLE BODY COMPONENTS

CROSS-REFERENCE TO RELATED APPLICATIONS

This application is a national stage of, and claims priority to, Patent Cooperation Treaty Application No. PCT/EP2015/000909, filed on May 4, 2015, which claims priority to German Application No. DE 10 2014 006 651.7 filed on May 7, 2014, each of which applications are hereby incorporated herein by reference in their entireties.

This disclosure relates to a coating system for coating components, in particular for painting motor vehicle body components.

Figure 1:
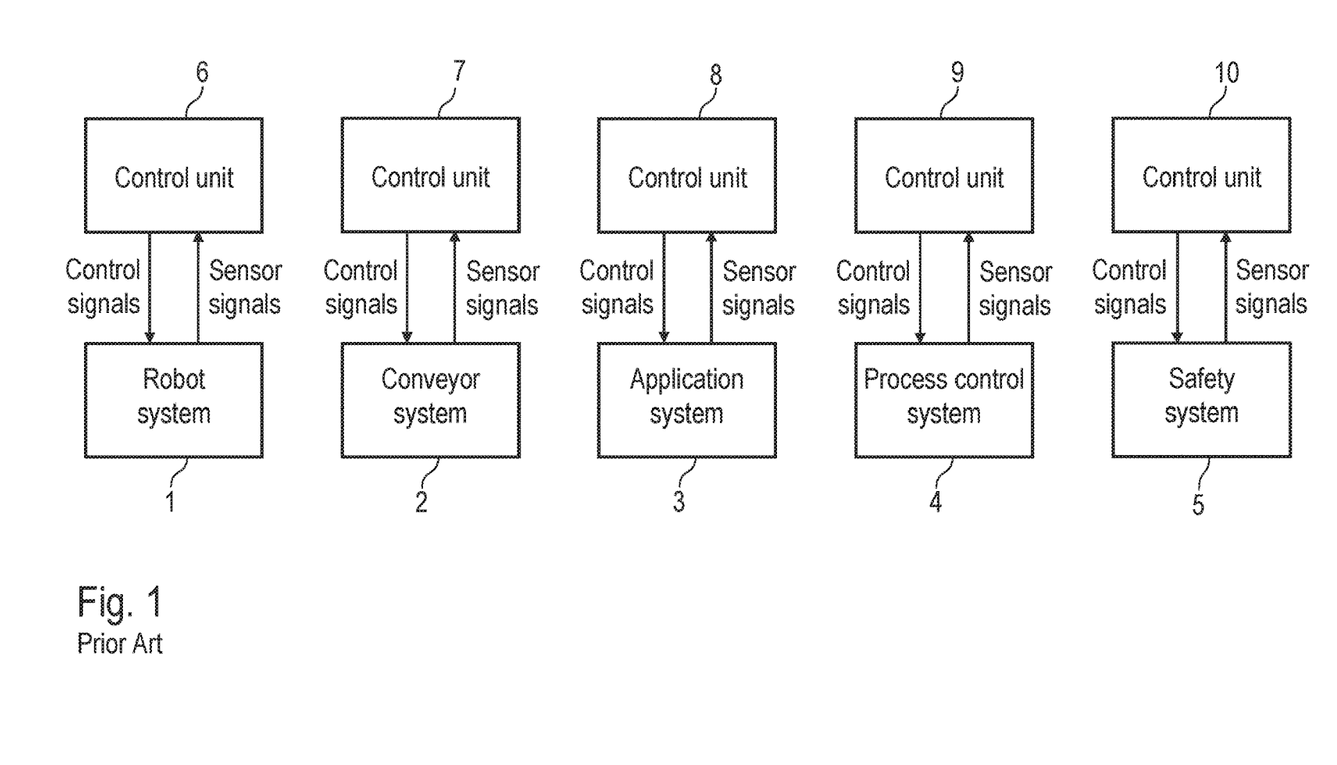
FIG. 1 shows a schematic representation of a conventional, prior art painting system.

FIG. 1 shows a schematic representation of a conventional painting system for painting motor vehicle body components. Conventional painting systems may have numerous sensor components and actuator components which can be subdivided into a robot system 1 (e.g. axis drives of a painting robot, drive of a travel axis of the painting robot, position sensors for determining the position of the robot axes and the travel axis), a conveying system 2 (e.g. a drive for a line conveyor for conveying the motor vehicle body components through the painting system, a travel measuring device for measuring the conveying route), an application system 3 (e.g. main needle valve of a rotary atomiser, valves for shaping air and propulsion air, a rotary speed sensor of the rotary atomiser, etc.), a process technology system 4 (e.g. air-conditioning system of a painting booth, sensors for temperature and air humidity in the painting booth, etc.) and a safety system 5 (e.g. detection of persons in the painting booth, alarm sirens, etc.).

In the conventional painting system according to FIG. 1, the robot system 1, the conveying system 2, the application system 3, the process technology system 4 and the safety system 5 are each associated with separate control units 6-10 which drive the respective actuator components and monitors the respective sensor components, wherein the control units 6-10 may also communicate with one another, which connections, for the sake of simplicity, are not shown.

Such a conventional painting system thus requires a plurality of separate control units 6-10, which control units 6-10 may originate from different manufacturers. Furthermore, for example, the conveying system 2 and the robot system 1 may be separated at customer premises. Therefore, such a conventional painting system provides for only a low level of integration and requires many interfaces. In effect, this leads to a restriction of the maximum possible throughput of motor vehicle body components which, in turn, increases the costs per unit, or CPU, i.e. the painting costs per motor vehicle body component. The reason for this is the data transmission between the control units 6-10, i.e. the "handshakes" of the separate controller units. Since these occur during operation—the "productive time", the data transmission time is lost as process time. The time can last between 100 ms and 10 s, wherein 1-3 s is regarded as typical. It would be desirable to reduce these times toward 0 ms.

From DE 10 2011 108 262 A1, a painting system is known, wherein one control device controls a plurality of robots, by which means collisions between the robots can be prevented. However, the control device is responsible, herein, only for the robots whereas the other control objects (e.g. conveying system, application system) are herein controlled separately.

Furthermore, reference is made with regard to the prior art, to DE 601 04 666 T2, DE 197 30 035 A1, DE 30 14 114 A1, U.S. 2014/0109830 A1 and U.S. 2010/0186664 A1.

SUMMARY

The present disclosure a coating system in which the different assemblies (e.g. robot system, conveying system, application system, process technology system, safety system) are commonly controlled by a central control unit.

In some exemplary embodiments of the disclosure, the central control unit controls not only the different assemblies (e.g. robot system, conveying system, application system, safety system, process technology system), but also interrogates the sensor components in these assemblies. Thus, the central control unit in some embodiments of the present disclosure receives sensor signals from the robot system, the conveying system, the application system, the process technology system and/or the safety system. For example, these sensor signals can convey the rotary speed of a rotary atomiser, the paint flow, the axis positions of the individual robot axes, the position of the robot along the travel axis, the temperature in the painting booth, the position of the motor vehicle body component on the conveyor or the position of booth doors, etc.

The term "application system" as used in the context of this disclosure includes at least one actuator component for application of the coating medium. For example, the term "application system" herein can comprise the following actuator components:

a colour changer which selects the coating medium to be applied from a plurality of available coating mediums. The central control unit can then control the colour changer such that the coating medium with the desired colour is selected. Furthermore, the control unit can also control the colour changer in such a way that the colour changer is rinsed, which is important on a change of colour.

a doser (any type of dosing device) for dosing the coating medium to be applied. Herein, the central control unit can set the feed rate (volume flow or mass flow) of the doser.

valves for controlling the coating medium flow, in particular a main needle valve of the application device (e.g. rotary atomiser). The central control unit can then open or close the valve in order to control the coating medium flow.

a shaping air device for supplying shaping air for forming a spray stream which is emitted by the application device (e.g. rotary atomiser). The central control unit can then set the shaping air flow in order to widen or narrow the spray stream emitted by the application device. The shaping air device may adjust a plurality of shaping air streams independently of one another.

a drive device for the mechanical powering of the application device, in particular for compressed air supply to a turbine of a rotary atomiser. The control unit can then control the drive device so that the application device (e.g. rotary atomiser) functions at the desired rotary speed.

an electrostatic coating medium charging device. The central control unit can then set the electrostatic coating medium charging device and, for example, set the charging voltage and limit values for current and voltage.

Furthermore, the term "application system" as used in herein further includes a plurality of sensor components which transmit sensor signals to the control unit. For example, the application system can have at least one of the following sensor components:

a rotary speed sensor which measures the rotary speed of a rotary atomiser which forms the application device. The control unit can control the rotary speed of the rotary atomiser and set the propulsion air accordingly.

flow sensors which measure pressure or quantity flow of shaping air flow, propulsion air flow or coating medium flow. This also enables, for example, a closed-loop control of shaping air flow, propulsion air flow or coating medium flow to a pre-determined target value.

a current sensor and/or a voltage sensor for measuring an operating variable of the electrostatic coating medium charging device.

It should be understood that the above-recited components are exemplary, i.e. the disclosure is not restricted to those sensor components and actuator components for an application system. In particular, an application system according to the principles of the present disclosure may also comprise further actuator components or sensor components.

In some exemplary embodiments of the disclosure, the robot system comprises a plurality of axis drives for mechanical driving the individual robot axes of the coating robot, wherein the control unit controls the axis drives. The control of the axis drives of the individual robot axes with the central control unit may, however, not take place directly through the central control unit. Rather, in such embodiments, a further subordinate control unit may be arranged between the central control unit and the axis drives.

Furthermore, the robot system can have a plurality of axis sensors as sensor components which measure the axis position of the individual robot axes of the coating robot and transmit them as a sensor signal to the control unit.

Furthermore, it should be noted that the coating robot can optionally be mounted locally fixed or along a travel axis. In a travelling arrangement of the coating robot, the robot system, in some embodiments, also comprises the drive for the travel axis and a position sensor for determining the position of the coating robot along the travel axis.

The term "conveying system" as used herein includes at least one actuator component which can be controlled by the central control unit. For example, the conveying system can comprise the following actuator components:

a conveyor which synchronously conveys a plurality of the components to be conveyed through the coating system. This means that the components to be coated are always conveyed jointly in the same rhythm and with the same velocity through the painting installation.

However, alternatively, the individual components may be conveyed asynchronously through the painting system. Herein, the components to be coated are each arranged on a respective conveying element (e.g. carriage), wherein the individual conveying elements can be conveyed independently of one another through the painting installation. Under the present state of development, however, all process cycles have the same cycle time.

Furthermore, the conveying system may also have a booth gate at the entry and/or at the exit of a coating booth and a gate drive each for opening or closing the booth gate, which does not belong to the actual state of the art.

Furthermore, the conveying system of this disclosure comprises at least one sensor component which sends sensor signals to the central control unit. For example, the conveying system can comprise the following sensor components in the context of the disclosure:

position sensors for detecting the position of the conveyor or the conveying elements.

velocity sensors for detecting the velocity of the conveyor or the conveying elements.

a reading station for identification of the incoming parts on the conveyor. For example, the reading station can optically identify the incoming components, for example, with an optical code applied to the individual components. Alternatively, the components to be coated may be each to be provided with a "radio frequency identification" ("RFID") transponder in order to identify the incoming components.

an object sensor for recognising the presence of a component on the conveyor or on the conveying elements. For example, an object sensor of this type can have a camera or an ultrasonic sensor.

a motor sensor for measuring the motor position and/or the motor rotary speed of a drive motor for powering the conveyor or the conveying elements.

The term "process technology system" as used herein includes at least one actuator component which can be controlled by the control unit. The term "process technology system" relates herein to technical components and parts relating to the air-conditioning of a coating booth or relating to the separation of coating material. For example, the process technology system can comprise the following actuator components in the context of the disclosure:

a drying apparatus for drying the booth air in the coating booth. The central control unit can then adjust the air humidity in the coating booth in that the drying apparatus is controlled accordingly.

an air-conditioning system for temperature control and humidifying the booth air in the coating booth. The central control unit can then adjust the air temperature in the coating booth in that the air-conditioning system is controlled accordingly.

a ventilation system which generates a downwardly directed airflow in the coating booth. The downwardly directed airflow provides in known manner that excess coating medium (overspray) in the coating booth is pushed downwardly and is therefore deposited to only a very slight extent on the booth walls or the other equipment of the coating booth, which would lead to undesirable soiling.

a separation unit, in particular a dry separation unit, for the separation of paint overspray.

Furthermore, the process technology system may also comprise sensor components, for example, a temperature sensor or a humidity sensor for measuring the climate in the coating booth.

The term "safety system" as used herein includes at least one sensor component which transmits sensor signals to the central control unit. For example, the safety system can comprise the following sensor components:

a first gate sensor for a closable gate for opening or closing an inlet of the coating booth, wherein the first gate sensor detects the position of the gate.

a second gate sensor for a closable gate for opening or closing an outlet of the coating booth, wherein the second gate sensor detects the position of the gate.

a door sensor which detects the position of an access door to the coating booth. The gate sensors and the door sensors enable access control to the coating booth so that it can be ensured that operation is only started when all doors and gates are closed.

a person sensor for detecting persons in the coating booth, to enable the system to proceed with the coating operation only if there is no person detected in the coating booth.

an emergency-off switch or emergency-stop switch for immediate switching off of the coating booth.

The safety system can also have at least one actuator component which can be controlled by the control unit. For example, the safety system can have an alarm siren, a flashing light, an air valve or a power protection as actuator components.

In some embodiments of the disclosure, the central control unit controls all the assemblies, specifically the robot system, the conveying system, the application system, the safety system and the process technology system.

In other embodiments, the central control unit controls and interrogates only a part of these assemblies, specifically for example, only the robot system, the conveying system, the application system and the safety system, whilst the process technology system is controlled or interrogated by a separate control unit.

In other examples of the present disclosure, however, only the robot system, the conveying system, the application system and the process technology system are controlled by the central control unit, whereas the safety system is controlled or interrogated by a separate control unit.

The central control unit can thus control and/or interrogate, for example, 2, 3, 4 or even 5 of these assemblies (robot system, conveying system, application system, safety system, process technology system), wherein any desired selection within these assemblies is possible.

It should further be mentioned that, in some embodiments, the central control unit is integrated into a housing. In this way, the system according to the present disclosure also differs from the conventional coating system described in the introduction, wherein the control intelligence is distributed over different control units in separate housings. In this way, the interface effort for internal communication and balancing of the control tasks may be advantageously reduced.

The central control unit can take account of the sensor signals in the control of the individual assemblies (robot system, conveying system, application system, safety system, process technology system), said sensor signals being received from all the assemblies (robot system, conveying system, application system, safety system, process technology system).

For example, the control unit can adapt the control signals for the robot system depending on the control signals and/or the sensor signals of the conveying system of the application system and/or the process technology system.

Furthermore, the control unit may adapt the control signals for the conveying system depending on the control signals and/or the sensor signals of the robot system, the application system and/or the process technology system.

Furthermore, the control unit may adapt the control signals for the application system depending on the control signals and/or the sensor signals of the conveying system, the robot system and/or the process technology system.

Furthermore, the control unit may adapt the control signals for the process technology system depending on the control signals and/or the sensor signals of the conveying system, the application system and/or the robot system.

In some exemplary embodiments of the disclosure, the central control unit realises a pre-determined relative movement of the application device relative to the component on the conveying system. For this purpose, the central control unit controls the robot system and the conveying system with one another so that the movement of the conveying system leads, in conjunction with the movement of the robot system, to the pre-set relative movement. The movement of the application device along the path is herein therefore not only realised by a movement of the application device, but through a combination of the movements of both the robot system and the conveying system. The conveying system or the conveyor of the conveying system thus herein effectively forms an additional robot axis which extends the kinematic range.

The control unit may, in some embodiments, move the conveying system bi-directionally. This means that the components to be coated can be conveyed not only forwardly but also backwardly through the painting system. This capability of the conveying system for a bidirectional movement is particularly advantageous if the conveying system effectively forms an additional robot axis.

The integral control of both the conveying system and also the robot system by the central control unit herein advantageously enables the conveying system effectively to form a robot axis. This would not be possible if the conveying system—as in the prior art—has a separate control unit, since then an exactly coordinated movement of firstly the robot system and secondly the conveying system would be difficult.

In some embodiments, the central control unit controls the conveying system such that the conveying system conveys the components at a variable conveying velocity.

First, in some embodiments, the conveying velocity herein can be varied jointly for all the components—e.g., if all the components are situated on a common linear conveyor.

Second, in some embodiments, the conveying velocity is individually varied for the individual components, which implies an asynchronous conveying of the components. This is the case, for example, if the components to be coated are not conveyed by a common linear conveyor, but by separate conveying elements.

In some embodiments of the present disclosure, the control unit adapts the control signals for the process technology system depending on the control signals and/or the sensor signals of the application system. For example, the downward air velocity in the coating booth can be set depending on the paint flow. For example, the downwardly directed air stream can be switched off entirely if the paint flow is zero, for example, during operating pauses. During intensive painting operation with a large paint flow, however, it is advantageous if a high downward air velocity is set in the coating booth, since then also a large amount of overspray occurs which must be conducted away as rapidly as possible. The adjustment of the downward air velocity depending on the actual requirement advantageously enables a reduction in the energy consumption with simultaneous optimisation of the overspray distance.

Furthermore, the control unit can set the downward air velocity in the coating booth, for example, also depending on the spatial orientation of the application device. Thus on painting of vertical component surfaces, a lower downward air velocity can be set than on painting of horizontal component surfaces. This is advantageous since on painting vertical component surfaces, the risk exists that the downwardly directed airflow influences the still damp coating medium on the component surface, which in a horizontal component surface is hardly the case. At the end of the painting process, the downward air velocity can be increased in order to flush out the booth more rapidly before the next workpiece arrives.

With such a relatively high level of integration, the system according to the principles of the present disclosure also enables optimum positioning of the components to be coated in the coating booth. Therefore, in some embodiments, the booth length may be reduced and this, in turn, leads to a smaller internal volume of the coating booth. The smaller internal volume of the coating booth is also advantageous since the air-conditioning effort can thus be reduced, which leads to a corresponding energy savings. The booth length of the coating booth can thus be smaller than the component length of the components to be coated, so that the components to be coated do not fit fully into the coating booth. For example, the booth length can be smaller than 80%, 60%, 50% or even 40% of the component length.

In a coating system of this type with a short coating booth, the central control unit, in some embodiments, controls the robot system and the application system such that the coating medium is applied only in a central coating region within the coating booth, wherein the central coating region lies, relative to the conveying direction, in the centre of the coating booth between the inlet and the outlet of the coating booth and the control system then controls the conveying system such that the components to be coated are positioned with the respective current paint impact point in the central coating region.

The central coating region, in some embodiments, has a relatively short extent along the conveying direction which is smaller than 70%, 50% or 30% of the booth length of the coating booth.

According to the principles of the present disclosure, the air-conditioning effort can be still further reduced in some embodiments, if the process technology system does not fully air-condition the interior space of the coating booth, but only partially or more strongly in the central coating region, which does not extend over the whole interior space of the coating booth.

Furthermore, in the context of the disclosure, a central visualisation unit is provided in order to visualise the operation of the coating system, wherein the visualisation system visualises the robot system, the conveying system, the application system, the safety system and/or the process technology system. For example, the visualisation unit can display a 3-D model of the coating system including the robot system, the conveying system, the application system, the safety system and the process technology system on a screen in order to enable an intuitive monitoring of the coating operation.

The visualisation unit herein represents the robot system, the conveying system, the application system, the safety system and/or the process technology system, in some embodiments, graphically in a perspective representation and chronologically synchronised with one another. This chronologically synchronised representation of the different assemblies (robot system, conveying system, application system, safety system, process technology system) is enabled or simplified by the degree of integration according to the disclosure.

Finally, the coating system according to the disclosure, in some embodiments, comprises an operating station in order to operate the robot system, the conveying system, the application system, the safety system and/or the process technology system. Herein, the operating station may enable a guided hand operation of the coating system, specifically in a fully automatic operation or in a semi-automatic operation.

The operating station can be arranged, for example, stationary, wherein the operating station is then, e.g., cable connected, in some embodiments, to the control unit.

In other embodiments of the present disclosure, the operating station is mobile and is wirelessly connected to the control unit.

DESCRIPTION

Figure 2:
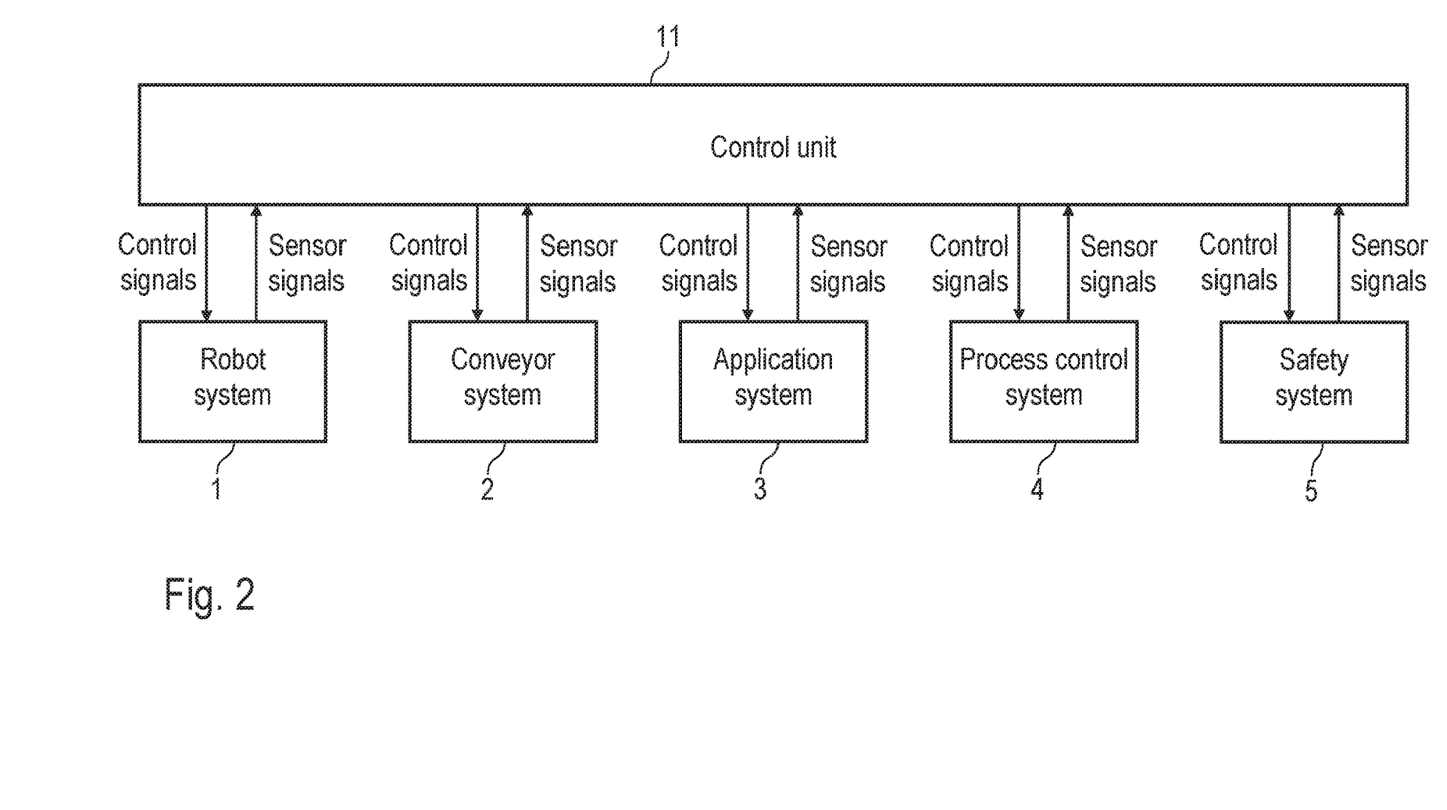
FIG. 2 shows a schematic representation of a painting system according to the present disclosure with a central control unit.

FIG. 2 shows a schematic representation of a painting system according to the present disclosure for painting motor vehicle body components, wherein the painting system according to the present disclosure partially includes elements of the painting system shown in FIG. 1, so that, for the avoidance of repetition, reference is made to the above description, wherein the same reference signs are used for corresponding details.

In contrast to the system of FIG. 1, however, the painting system according to the present disclosure includes a central control unit 11 which controls and interrogates all the assemblies, specifically the robot system 1, the conveying system 2, the application system 3, the process technology system 4 and the safety system 5. This high level of integration with the central control unit 11 enables various advantages.

First, the interface effort required, as compared to that required in the conventional painting system of FIG. 1 in order to enable communication between the different control units 6-10, is reduced.

Second, only the central control unit 11 is still required, so that the effort for the numerous control units 6-10 in the conventional painting system of FIG. 1 may be avoided.

Furthermore, the integration of all the control functions in the central control unit according to the principles of the present disclosure also enables a coordinated operation of the robot system 1 together with the conveying system 2. Thus the movement path of an application device can then be realised, for example, through a combined movement of the robot system, on one hand, and the conveying system 2, on the other hand, so that that conveying system 2 can effectively emulate a further robot axis.

Furthermore, the process technology system 4 can also be controlled depending on the application system 3. For example, the downward air velocity in a painting booth can be adapted depending on the prevailing paint flow.

Figure 3:
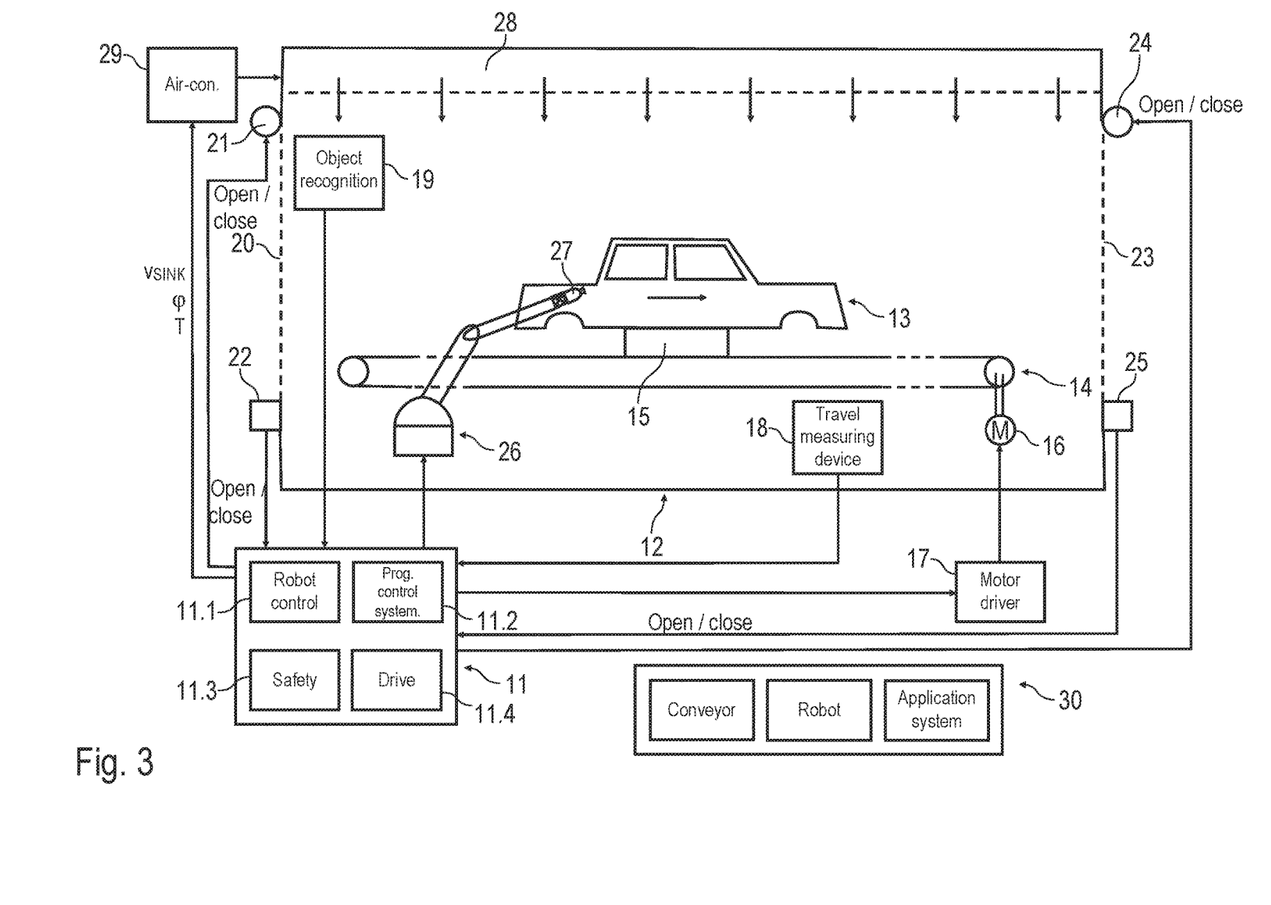
FIG. 3 shows a schematic representation of the painting system of FIG. 2.

FIG. 3 shows a schematic representation of a painting system of this type with a painting booth 12 for painting motor vehicle body components 13.

The motor vehicle body components 13 are herein conveyed by a conveyor 14 in the direction of the arrow through the painting booth 12, wherein the motor vehicle body components 13 are each held on a "skid" 15 on the conveyor 14.

The conveyor 14 is herein driven by a drive motor 16, wherein the drive motor 16 is powered by a motor driver 17.

Furthermore, a travel measuring device 18 which measures the position of the conveyor 14 and thus also the position of the motor vehicle body components 13 is arranged in the painting booth 12.

Furthermore, an object sensor 19 which can detect the presence of the motor vehicle body component 13 and the position of the motor vehicle body component 13 on the conveyor 14 is situated in the painting booth 12. For example, the object sensor 19 can operate with a camera or with ultrasonic sensors.

The painting booth 12 has an inlet gate 20 on the inlet side which can be opened or closed by a gate drive 21, wherein the position of the inlet gate 20 can be detected by a position sensor 22.

Arranged at the outlet of the painting booth 12 is a corresponding outlet gate 23 which can be opened or closed by a gate drive 24, wherein the position of the outlet gate 23 is detected by a further position sensor 25.

Arranged in the painting booth 12 is a multi-axis painting robot 26 which guides a rotary atomiser 27 as the application device.

The painting booth 12 also comprises a "filter ceiling" 28 which emits a downwardly directed airflow into the painting booth 12. The downwardly directed airflow is herein indicated by arrows and is intended to push overspray downwardly in the painting booth 12 so that the overspray is not deposited on the inner walls of the painting booth 12 or on the other equipment of the painting booth 12.

The filter ceiling 28 is connected for this purpose to an air-conditioning system 29 which also has the purpose of air-conditioning the interior space of the painting booth 12.

The central control unit 11 is connected to the above described different assemblies of the robot system 1, the conveying system 2, the application system 3, the process technology system 4 and the safety system 5 and, in this way, enables a coordinated operation of the different assemblies.

As shown schematically in the drawing, the central robot control system 11 comprises a robot control system 11.1, a programmable control system 11.2 (SPS), a safety control system 11.3 and a drive control system 11.4.

It is also shown in the drawing that a central visualisation apparatus 30 is provided in order to visualise the conveying system 2, the robot system 1 and the application system 3.

Figure 4:
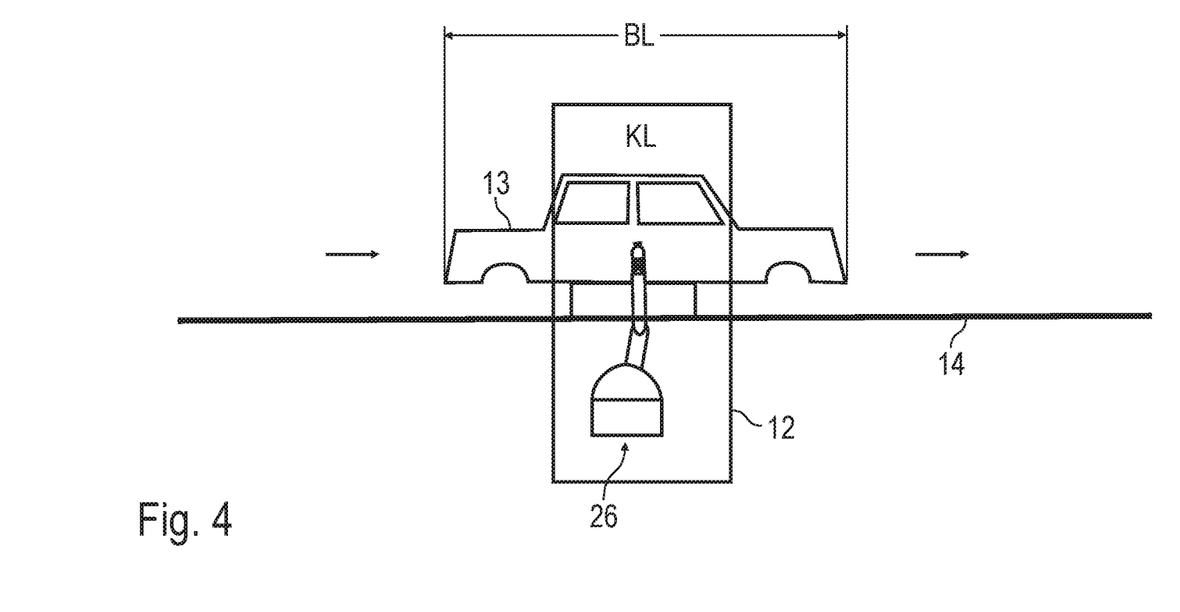
FIG. 4 shows a partial schematic representation of a painting system of the present disclosure in which the coating booth is configured with a relatively short booth length.

FIG. 4 shows a modification of the exemplary embodiment according to FIG. 3, so that, for the avoidance of repetition, reference is made to the above description, wherein the same reference signs are used for corresponding details.

As the drawing shows, the painting booth 12 in this exemplary embodiment has a relatively short booth length KL in the conveying direction, wherein the booth length KL is substantially shorter than the component length BL of the motor vehicle body components 13 to be coated. The reduction of the booth length KL leads to a reduction of the internal volume of the painting booth 12 which, in turn, leads to a significant reduction in the air-conditioning effort and the associated energy use.

The present disclosure is not restricted to the above-described exemplary embodiments. Rather a plurality of variants and modifications is possible which also make use of the disclosed concepts.

The invention claimed is:

1. A coating system for application of coatings to components, wherein said components are motor vehicle body components, the coating system comprising:
    a coating booth,
    a conveying system configured to convey the components through the coating booth in a conveying direction and at a conveying velocity,
    an application system having an application device configured to apply a coating medium onto the components,
    a process technology system configured to air-condition an interior region of the coating booth, the process technology system having a ventilation system configured to generate an air flow through the coating booth,
    a safety system configured to monitor the coating system,
    a robot system having a multi-axis coating robot, the multi-axis coating robot coupled to the application device and configured to guide the application device,
    one or more sensor components in each of the conveying system, the application system, the process technology system, the safety system, and the robot system, respectively, and
    a control unit in communication with at least the conveying system, the robot system, the application system, and the process technology system, the control unit being directly coupled to the sensor components, the sensor components
    each being configured to transmit the respective sensor signals directly to the control unit,
    the control unit being to transmit directly to, each of the conveying system, the application system, the process technology system, the safety system, and the robot system, respectively,
    wherein the control unit adapts one or more of conveying control signals for at least one of the conveying direction and the conveying velocity of the components through the coating booth of the conveying system, the control unit adapting the one or more conveying control signals according to one or more of the sensor signals of the robot system transmitted directly to the control unit, the control unit transmitting the one or more conveying control signals directly to the conveying system,
    wherein the control unit adapts one or more of control signals for the robot system to at least a configuration of the multi-axis coating robot of the robot system, the control unit determining the one or more robot control signals according to one or more of the sensor signals of the conveying system transmitted directly to the control unit, the control unit transmitting the one or more robot control signals directly to the robot system,
    wherein the control unit adapts one or more of application control signals for operation of the application device of the application system, the control unit adapts one or more of ventilation control signals for the air flow through the coating booth generated by the ventilation system of the process technology system, the control unit adapting the one or more of the application control signals and the one or more of the ventilation control signals according to at least one of one or more of the sensor signals from the conveying system and one or more of the sensor signals from the robot system transmitted directly to the control unit, the control unit transmitting the one or more application control signals directly to the application system, the control unit transmitting the one or more ventilation control signals to the process technology system.

2. The coating system according to claim 1, wherein the application system comprises at least one actuator component controlled by the control unit with control signals, the at least one actuator component being one of:
    a colour changer selectively providing the coating medium to be applied from a plurality of available coating mediums, a doser device configured to dose the coating medium to be applied, valves controlling flow of the coating medium, a shaping air device configured to emit shaping air to form a spray stream from the application device, a drive device coupled to the application device and configured to mechanically drive the application device, and an electrostatic coating medium charging device.

3. The coating system according to claim 1, wherein the application system comprises at least one of sensor component which transmits sensor signals to the control unit, the at least one sensor component being one of:

a rotary speed sensor configured to measure a rotary speed of a rotary atomiser of the application device, flow sensors configured to measure one of pressure and quantity flow of one of a shaping air flow, a propulsion air flow, and a coating medium flow, respectively, a current sensor configured to measure an operating variable of an electrostatic coating medium charging device, a voltage sensor configured to measure an operating variable of the electrostatic coating medium charging device.

4. The coating system according to claim 1, wherein the robot system comprises a plurality of axis drives configured to mechanically drive the individual robot axes, respectively, of the coating robot, wherein the control unit controls the axis drives and the robot system comprises a plurality of axis sensors configured to measure an axis position of the individual robot axes of the coating robot and transmit a corresponding sensor signal to the control unit.

5. The coating system according to claim 1, wherein the coating robot is locally fixed.

6. The coating system according to claim 1, wherein the conveying system comprises a conveyor configured to carry a plurality of the components synchronously through the coating system, the control unit controlling the conveyor.

7. The coating system according to claim 1, wherein the conveying system comprises a plurality of conveying elements each configured to carry at least one of the components through the coating system to facilitate an asynchronous conveying of the components, the control unit controlling each of the plurality of conveying elements.

8. The coating system according to claim 1, further comprising:

a first gate drive configured to actuate a gate at an inlet of the coating booth, a second gate drive configured to actuate a gate at an outlet of the coating booth.

9. The coating system according to claim 1, wherein the conveying system comprises at least one sensor component which transmits sensor signals to the control unit, the at least one sensor component being one of:

position sensors configured to detect a position of one of a conveyor and conveying elements, velocity sensors configured to detect a velocity of one of the conveyor and the conveying elements, a reading station configured to detect identification parameters of incoming components, an object sensor configured to identify a presence of a component, and a motor sensor configured to measure at least one of a motor position and a motor rotary speed of a drive motor for powering one of the conveyor and the conveying elements.

10. The coating system according to claim 1, wherein the process technology system comprises at least one actuator component controlled by the control unit, the at least one actuator component being one of:

a drying apparatus configured to dry booth air in the coating booth, an air-conditioning system configured to provide temperature control of the booth air in the coating booth, a ventilation system configured to generate a downwardly directed airflow in the coating booth, a separation unit configured to separate overspray of the coating medium.

11. The coating system according to claim 1, wherein the safety system comprises at least one sensor component which transmits sensor signals to the control unit, the at least one sensor component being one of:

a first gate sensor at a first gate of an inlet of the coating booth, the first gate sensor configured to detect a position of the first gate, a second gate sensor at a second gate of an outlet of the coating booth, the second gate sensor configured to detect a position of the second gate, a door sensor configured to detect a position of an access door to the coating booth, a person sensor configured to detect a person in the coating booth, an emergency-off switch.

12. The coating system according to claim 1, wherein the control unit determines the control signals for each of the robot system, the conveying system, the application system, and the process technology system, respectively, according to the control signals for and the sensor signals from each of the others of the robot system, the conveying system, the application system and the process technology system, respectively.

13. The coating system according to claim 1, wherein the control unit is configured to coordinate both the robot system and the conveying system to effect a pre-determined path-shaped relative movement of the application device relative to the component on the conveying system, the conveying system is bidirectionally movable, and the control unit controls the conveying system to carry the components at varied conveying velocities.

14. The coating system according to claim 1, wherein the control unit determines the control signals for the process technology system depending on the control signals and the sensor signals of the application system, the control unit determines a downward air velocity in the coating booth depending on the paint flow, the control unit determines the downward air velocity in the coating booth depending on a spatial orientation of the application device, and the control unit determines the downward air velocity depending on an orientation of a surface to be painted, the control unit determining a lower value for the downward air velocity in the coating booth on painting of vertical component surfaces than on painting of horizontal component surfaces.

15. The coating system according to claim 1, wherein the coating booth has a defined booth length in the conveying direction, and the components to be coated have a defined component length in the conveying direction, and the booth length is smaller than the component length.

16. The coating system according to claim 1, wherein the control unit controls the robot system and the application system such that the coating medium is applied only in a central coating region, the central coating region being, relative to the conveying direction, centrally between the inlet and the outlet of the coating booth, the control unit controls the conveying system such that the conveying system positions the components to be coated with a current paint target in the central coating region, and the process technology system is configured to direct air-conditioning of the coating booth at the central coating region.

17. The coating system according to claim 1, further comprising:

an operating station configured to provide a guided hand operation of the coating system.

18. The coating system according to claim 17, wherein the operating station is stationary and wire-connected to the control unit.

19. The coating system according to claim 17, wherein the operating station is mobile and is wirelessly connected to the control unit.

20. The coating system according to claim 1, wherein the control signals for the conveying system and the robot system, respectively, are each determined by the control unit further according to a pre-determined relative movement of the application device relative to one of the components on the conveying system.

* * * * *